United States Patent
Zhang et al.

(10) Patent No.: US 9,024,540 B2
(45) Date of Patent: May 5, 2015

(54) OVERVOLTAGE PROTECTION METHOD FOR BACKLIGHT DRIVE CIRCUIT OF 2D/3D MODE AND BACKLIGHT DRIVE CIRCUIT USING SAME

(71) Applicant: Shenzhen China Star Optoelectronics Technology Co., Ltd., Shenzhen, Guangdong (CN)

(72) Inventors: Hua Zhang, Shenzhen (CN); Xianming Zhang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 255 days.

(21) Appl. No.: 13/814,743

(22) PCT Filed: Jan. 6, 2013

(86) PCT No.: PCT/CN2013/070085
§ 371 (c)(1),
(2) Date: Feb. 7, 2013

(87) PCT Pub. No.: WO2014/101309
PCT Pub. Date: Jul. 3, 2014

(65) Prior Publication Data
US 2014/0184959 A1 Jul. 3, 2014

(51) Int. Cl.
*G05F 1/00* (2006.01)
*H05B 33/08* (2006.01)

(52) U.S. Cl.
CPC ........ *H05B 33/0887* (2013.01); *H05B 33/0809* (2013.01); *Y02B 20/341* (2013.01)

(58) Field of Classification Search
CPC .................................... H05B 33/0815
USPC ......................................... 315/307
See application file for complete search history.

(56) References Cited

U.S. PATENT DOCUMENTS 6,359,391 B1 * 3/2002 Li ................................. 315/291

FOREIGN PATENT DOCUMENTS

| CN | 1428758 A | 7/2003 |
| CN | 201680231 U | 12/2010 |
| CN | 101944331 A | 1/2011 |
| CN | 102610200 A | 7/2012 |
| CN | 102708805 A | 10/2012 |
| CN | 102711316 A | 10/2012 |

* cited by examiner

*Primary Examiner* — Daniel Rojas
(74) *Attorney, Agent, or Firm* — Andrew C. Cheng (57) ABSTRACT

The present invention provides an overvoltage protection method for backlight drive circuit of 2D/3D mode and a backlight drive circuit using the method. The method includes: providing a liquid crystal display, the liquid crystal display having a 2D mode and a 3D mode, the liquid crystal display including a backlight drive circuit; the backlight drive circuit using the first overvoltage protection voltage level as an overvoltage protection voltage level when the liquid crystal display is set in the 2D mode; and the backlight drive circuit using the second the overvoltage protection voltage level as an overvoltage protection voltage level when the liquid crystal display is set in the 3D mode, the second the overvoltage protection voltage level being greater than the first overvoltage protection voltage level. Different overvoltage protection voltage levels are provided for the 2D and 3D modes so as to alleviate impact on components by over voltage.

11 Claims, 3 Drawing Sheets

OVERVOLTAGE PROTECTION METHOD FOR BACKLIGHT DRIVE CIRCUIT OF 2D/3D MODE AND BACKLIGHT DRIVE CIRCUIT USING SAME

BACKGROUND OF THE INVENTION

1. Field of the Invention

The present invention relates to the field of liquid crystal display, and in particular to an LED (Light-Emitting Diode) backlight drive method and drive circuit of liquid crystal display.

2. The Related Arts

Liquid crystal displays (LCDs) have a variety of advantages, such as thin device body, low power consumption, and being free of radiation, and is thus widely used. Most of the LCDs that are currently available in the market are backlighting LCDs, which comprise a liquid crystal panel and a backlight module. The operative principle of the liquid crystal panel is that liquid crystal molecules are interposed between two parallel glass substrates and the liquid crystal molecules are controlled to change direction by application of electricity to the glass substrates in order to refract out light emitting from the backlight module for generating images. Since the liquid crystal panel itself does not emit light, light must be provided by the backlight module in order to normally display images. Thus, the backlight module is one of the key components of the LCDs. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to directly provide a planar light source to the liquid crystal panel. The side-edge backlight module comprises a backlight source comprising an LED light bar that is arranged at an edge of a backplane to be located rearward of one side of the liquid crystal panel. The LED light bar emits light that enters a light guide plate (LGP) through a light incident face at one edge of the light guide plate and is projected out of a light emergence face of the light guide plate, after being reflected and diffused, to transmit through an optic film assembly to form a planar light source for the liquid crystal display panel.

Figure 1:
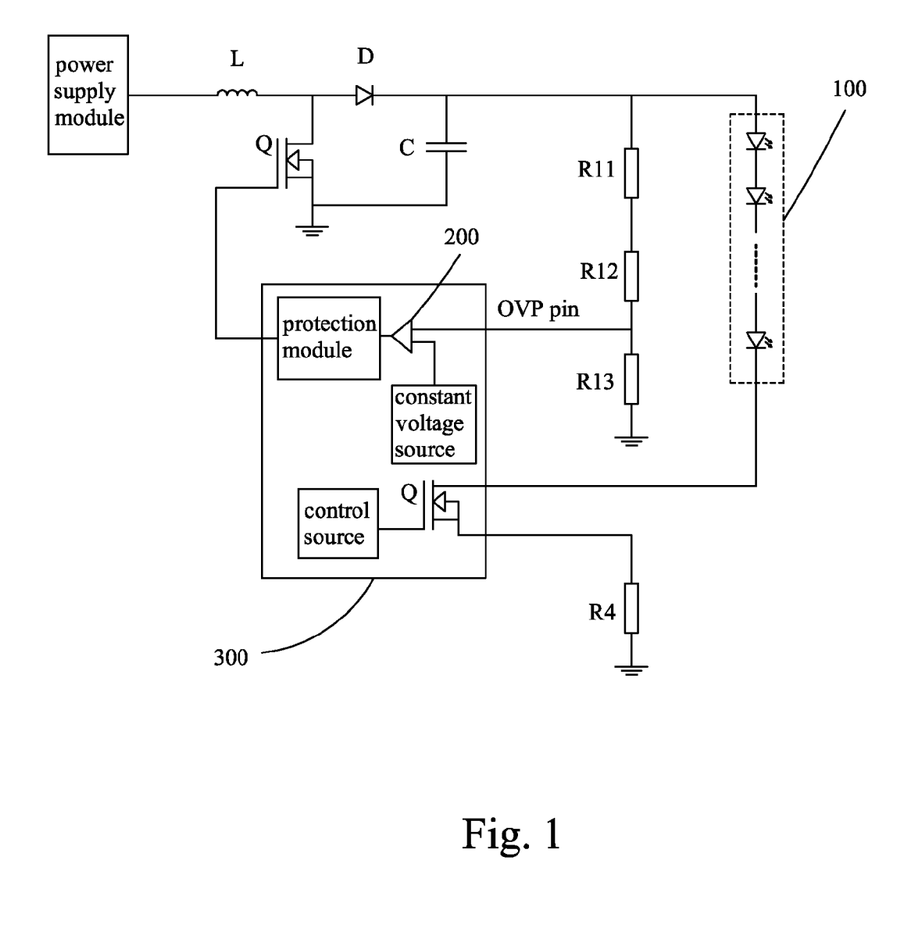
FIG. 1 is a circuit diagram of a preferred embodiment of conventional backlight drive circuit.

Referring to FIG. 1, which is a conventional LED backlight drive circuit for a liquid crystal display having 2D and 3D modes, a constant current driving IC (constant current driving chip) 300 comprises an OVP pin (providing overvoltage protection) that is associated with an internal voltage comparator 200 in connection with a divided voltage of a driving voltage of an LED string 100 obtained with a series connection of resistors R11, R12, R13. When the voltage across the resistor R13 is greater than a constant voltage source (which is generally 2V) internally of the constant current driving IC 300, the constant current driving IC 300 cuts off a driving signal to a field effect transistor so that an output voltage (which is the driving voltage of the LED string 100) is no longer increased thereby protecting the components of the backlight drive circuit. The electrical current flowing through the LED string 100 is of a linear relationship with respect to the desired level of voltage. In a liquid crystal display having 2D and 3D modes, the peak value of LED driving current for the backlight source in the 3D mode is high so that the level of the driving voltage is also high. Taking a string having 8 LEDs as an example for computation purposes, the driving voltage required for 3D mode is about 10V higher than that for 2D mode. Consequently, design of the voltage level for overvoltage protection is generally done as 1.2 times of the driving voltage of the LED string in 3D mode. On the other hand, if the voltage level for overvoltage protection is designed according to the required driving voltage for the LED string 100 in 2D mode, the driving voltage may not be sufficient for the LED string 100 in 3D mode, making it not normally lit.

However, using the driving voltage required for LED string in 3D mode to design the voltage level for overvoltage protection has the following shortcoming. When abnormality occurs in the operation in 2D mode, the output voltage is excessively high, which causes excessive instantaneous impact to the components of the backlight drive circuit, thereby shortening the lifespan of the components.

SUMMARY OF THE INVENTION

An object of the present invention is to provide an overvoltage protection method for backlight drive circuit of 2D/3D mode, which uses a 2D/3D signal source to control an electrical switch to close and open so as to control whether a first resistor is connected to the circuit for flow division so as to provides different overvoltage protection voltage levels for the 2D mode and the 3D mode to effect protection of components and extension of the lifespan of the components.

Another object of the present invention is to provide a backlight drive circuit, which provides different overvoltage protection voltage levels for a 2D mode and a 3D mode according to different levels of driving voltage of an LED (Light-Emitting Diode) string in the 2D mode and the 3D mode, so as to alleviate impact on components by over voltage when abnormality occurs in the 2D mode and thus extend the lifespan of the components.

To achieve the objects, the present invention provides an overvoltage protection method for backlight drive circuit of 2D/3D mode, which comprises the following steps:

(1) providing a liquid crystal display, the liquid crystal display having a 2D mode and a 3D mode, the liquid crystal display comprising a backlight drive circuit;

(2) the backlight drive circuit using the first overvoltage protection voltage level as an overvoltage protection voltage level when the liquid crystal display is set in the 2D mode; and (3) the backlight drive circuit using the second the overvoltage protection voltage level as an overvoltage protection voltage level when the liquid crystal display is set in the 3D mode, the second the overvoltage protection voltage level being greater than the first overvoltage protection voltage level.

The backlight drive circuit comprises: a power supply module, an electrical inductor, which has an end electrically connected to the power supply module, and a rectification module electrically connected to an opposite end of the electrical inductor, a filter module electrically connected to an opposite end of the rectification module, a voltage division module electrically connected to the opposite end of the rectification module, an LED string electrically connected to the opposite end of the rectification module, a first field effect transistor electrically connected to the opposite end of the electrical inductor, a constant current driving chip electrically connected to the first field effect transistor, a first resistor electrically connected to the constant current driving chip, an electrical switch electrically connected to the first resistor, and a 2D/3D signal source electrically connected to the electrical switch. The constant current driving chip is electrically connected to the LED string and the voltage division module. The first field effect transistor, the filter module, the voltage division module, the constant current driving chip, and the electrical switch are electrically connected to a ground line.

The voltage division module comprises: a second resistor, a third resistor, and a fourth resistor. The second, the third, the fourth resistors are connected in series.

When the liquid crystal display is operating in the 2D mode, the 2D/3D signal source supplies an output of low voltage signal, controlling the electrical switch to open so that the first resistor and the voltage division module are disconnected from each other; and when the liquid crystal display operates in the 3D mode, the 2D/3D signal source supplies an output of high voltage signal, controlling the electrical switch to close so that the first resistor and the voltage division module are set in parallel connection with each other.

In Step (2), when the 2D/3D signal source outputs a low level, the electrical switch is open and the first overvoltage protection voltage level of the drive circuit is $2/R4*(R2+R3)+2$, whereby when the backlight drive circuit supplies a driving voltage that is normally smaller than or equal to the first overvoltage protection voltage level, the constant current driving chip supplies a low level to the first field effect transistor, making the first field effect transistor in a cut-off state; and when the backlight drive circuit supplies a driving voltage that is abnormally greater than the first overvoltage protection voltage level, the constant current driving chip supplies a high level to the first field effect transistor, making the first field effect transistor conducting, thereby forcing the driving voltage applied to the LED string to be lowered down, wherein R2 is the resistance of the second resistor, R3 is the resistance of the third resistor, and R4 is the resistance of the fourth resistor; and in Step (3), the 2D/3D signal source outputs a high level and the electrical switch is closed, the second the overvoltage protection voltage level of the drive circuit being $2/(R1\|R4)*(R2+R3)+2$, whereby when the backlight drive circuit supplies a driving voltage that is normally smaller than or equal to the second the overvoltage protection voltage level, the constant current driving chip supplies a low level to the first field effect transistor, making the first field effect transistor in a cut-off state; and when the backlight drive circuit supplies a driving voltage that is abnormally greater than the second overvoltage protection voltage level, the constant current driving chip supplies a high level to the first field effect transistor, making the first field effect transistor conducting, thereby forcing the driving voltage applied to the LED string to be lowered down, wherein R1 is the resistance of the first resistor and $R1\|R4$ stands for $R1*R4/(R1+R4)$.

The electrical switch comprises a second field effect transistor or a bipolar junction transistor. The rectification module comprises a rectification diode. The rectification diode has an anode terminal and a cathode terminal. The anode terminal is electrically connected to the electrical inductor. The cathode terminal is electrically connected to a common terminal of the filter module, the voltage division module, and the LED string. The filter module comprises an electrical capacitor. The electrical capacitor has an end electrically connected to the cathode terminal of the rectification diode and an opposite end connected to the ground line. The first field effect transistor comprises a source terminal, a gate terminal, and a drain terminal. The gate terminal is electrically connected to the constant current driving chip. The source terminal is electrically connected to the ground line. The drain terminal is electrically connected to a common terminal of the electrical inductor and the rectification diode. The constant current driving chip comprises first to fourth pins. The first pin is electrically connected to the gate terminal of the first field effect transistor. The second pin is electrically connected to the voltage division module. The third pin is electrically connected to the LED string. The fourth pin is electrically connected to the ground line. The constant current driving chip comprises: a constant current source, a voltage comparator electrically connected to the constant current source, a protection module electrically connected to the voltage comparator, a third field effect transistor, and a control source electrically connected to the third field effect transistor. The voltage division module comprises: the second resistor, the third resistor, and the fourth resistor. The second, the third, and the fourth resistor are connected in series. The second pin of the constant current driving chip and an end of the first resistor are electrically connected to a common node between the third and fourth resistors.

The present invention also provides an overvoltage protection method for backlight drive circuit of 2D/3D mode, which comprises the following steps:

(1) providing a liquid crystal display, the liquid crystal display having a 2D mode and a 3D mode, the liquid crystal display comprising a backlight drive circuit;

(2) the backlight drive circuit using the first overvoltage protection voltage level as an overvoltage protection voltage level when the liquid crystal display is set in the 2D mode; and (3) the backlight drive circuit using the second the overvoltage protection voltage level as an overvoltage protection voltage level when the liquid crystal display is set in the 3D mode, the second the overvoltage protection voltage level being greater than the first overvoltage protection voltage level; and wherein the backlight drive circuit comprises: a power supply module, an electrical inductor, which has an end electrically connected to the power supply module, and a rectification module electrically connected to an opposite end of the electrical inductor, a filter module electrically connected to an opposite end of the rectification module, a voltage division module electrically connected to the opposite end of the rectification module, an LED string electrically connected to the opposite end of the rectification module, a first field effect transistor electrically connected to the opposite end of the electrical inductor, a constant current driving chip electrically connected to the first field effect transistor, a first resistor electrically connected to the constant current driving chip, an electrical switch electrically connected to the first resistor, and a 2D/3D signal source electrically connected to the electrical switch, the constant current driving chip being electrically connected to the LED string and the voltage division module, the first field effect transistor, the filter module, the voltage division module, the constant current driving chip, and the electrical switch being electrically connected to a ground line, the voltage division module comprising: a second resistor, a third resistor, and a fourth resistor, the second, the third, the fourth resistors being connected in series;

wherein when the liquid crystal display is operating in the 2D mode, the 2D/3D signal source supplies an output of low voltage signal, controlling the electrical switch to open so that the first resistor and the voltage division module are disconnected from each other; and when the liquid crystal display operates in the 3D mode, the 2D/3D signal source supplies an output of high voltage signal, controlling the electrical switch to close so that the first resistor and the voltage division module are set in parallel connection with each other;

wherein in Step (2), when the 2D/3D signal source outputs a low level, the electrical switch is open and the first overvoltage protection voltage level of the drive circuit is $2/R4*(R2+R3)+2$, whereby when the backlight drive circuit supplies a driving voltage that is normally smaller than or equal to the first overvoltage protection voltage level, the constant current driving chip supplies a low level to the first field effect transistor, making the first field effect transistor in a cut-off state; and when the backlight drive circuit supplies a driving voltage that is abnormally greater than the first overvoltage protection voltage level, the constant current driving chip supplies a high level to the first field effect transistor, making the first field effect transistor conducting, thereby forcing the driving voltage applied to the LED string to be lowered down, wherein R2 is the resistance of the second resistor, R3 is the resistance of the third resistor, and R4 is the resistance of the fourth resistor; and in Step (3), the 2D/3D signal source outputs a high level and the electrical switch is closed, the second the overvoltage protection voltage level of the drive circuit being 2/(R1∥R4)*(R2+R3)+2, whereby when the backlight drive circuit supplies a driving voltage that is normally smaller than or equal to the second the overvoltage protection voltage level, the constant current driving chip supplies a low level to the first field effect transistor, making the first field effect transistor in a cut-off state; and when the backlight drive circuit supplies a driving voltage that is abnormally greater than the second overvoltage protection voltage level, the constant current driving chip supplies a high level to the first field effect transistor, making the first field effect transistor conducting, thereby forcing the driving voltage applied to the LED string to be lowered down, wherein R1 is the resistance of the first resistor and R1∥R4 stands for R1*R4/(R1+R4); and wherein the electrical switch comprises a second field effect transistor or a bipolar junction transistor, the rectification module comprising a rectification diode, the rectification diode having an anode terminal and a cathode terminal, the anode terminal being electrically connected to the electrical inductor, the cathode terminal being electrically connected to a common terminal of the filter module, the voltage division module, and the LED string, the filter module comprising an electrical capacitor, the electrical capacitor having an end electrically connected to the cathode terminal of the rectification diode and an opposite end connected to the ground line, the first field effect transistor comprising a source terminal, a gate terminal, and a drain terminal, the gate terminal being electrically connected to the constant current driving chip, the source terminal being electrically connected to the ground line, the drain terminal being electrically connected to a common terminal of the electrical inductor and the rectification diode, the constant current driving chip comprising first to fourth pins, the first pin being electrically connected to the gate terminal of the first field effect transistor, the second pin being electrically connected to the voltage division module, the third pin being electrically connected to the LED string, the fourth pin being electrically connected to the ground line, the constant current driving chip comprising: a constant current source, a voltage comparator electrically connected to the constant current source, a protection module electrically connected to the voltage comparator, a third field effect transistor, and a control source electrically connected to the third field effect transistor, the voltage division module comprising: the second resistor, the third resistor, and the fourth resistor, the second, the third, the fourth resistor being connected in series, the second pin of the constant current driving chip and an end of the first resistor being electrically connected to a common node between the third and fourth resistors.

The present invention further provides a backlight drive circuit, which comprises: a power supply module, an electrical inductor, which has an end electrically connected to the power supply module, and a rectification module electrically connected to an opposite end of the electrical inductor, a filter module electrically connected to an opposite end of the rectification module, a voltage division module electrically connected to the opposite end of the rectification module, an LED string electrically connected to the opposite end of the rectification module, a first field effect transistor electrically connected to the opposite end of the electrical inductor, a constant current driving chip electrically connected to the first field effect transistor, a first resistor electrically connected to the constant current driving chip, an electrical switch electrically connected to the first resistor, and a 2D/3D signal electrically connected to the electrical switch. The constant current driving chip is electrically connected to the LED string and the voltage division module. The first field effect transistor, the filter module, the voltage division module, the constant current driving chip, and the electrical switch are electrically connected to a ground line, whereby the electrical switch is controlled to close or open according to a high or low voltage signal supplied from the 2D/3D signal source, thereby controlling the first resistor to connect to or disconnect from the voltage division module.

The electrical switch comprises a second field effect transistor or a bipolar junction transistor.

The rectification module comprises a rectification diode. The rectification diode has an anode terminal and a cathode terminal. The anode terminal is electrically connected to the electrical inductor. The cathode terminal is electrically connected to a common terminal of the filter module, the voltage division module, and the LED string. The filter module comprises an electrical capacitor. The electrical capacitor has an end electrically connected to the cathode terminal of the rectification diode and an opposite end connected to the ground line. The first field effect transistor comprises a source terminal, a gate terminal, and a drain terminal. The gate terminal is electrically connected to the constant current driving chip. The source terminal is electrically connected to the ground line. The drain terminal is electrically connected to a common terminal of the electrical inductor and the rectification diode.

The constant current driving chip comprises first to fourth pins. The first pin is electrically connected to the gate terminal of the first field effect transistor. The second pin is electrically connected to the voltage division module. The third pin is electrically connected to the LED string. The fourth pin is electrically connected to the ground line. The constant current driving chip comprises: a constant current source, a voltage comparator electrically connected to the constant current source, a protection module electrically connected to the voltage comparator, a third field effect transistor, and a control source electrically connected to the third field effect transistor.

The voltage division module comprises: a second resistor, a third resistor, and a fourth resistor. The second, the third, and the fourth resistors are connected in series. The second pin of the constant current driving chip and an end of the first resistor are electrically connected to a common node between the third and fourth resistors.

The efficacy of the present invention is that the present invention provides an overvoltage protection method for backlight drive circuit of 2D/3D mode, wherein by adding an electrical switch and a resistor and using a 2D/3D signal source generated by a control board to control the electrical switch to conduct on or cut off, the resistor is disconnected in a 2D mode to lower down the overvoltage protection voltage level supplied in the 2D mode and the resistor is connected in a 3D mode to increase the overvoltage protection voltage level supplied in the 3D mode. According to the different levels of driving voltage that an LED string needs in the 2D mode and the 3D mode, different overvoltage protection voltage levels are supplied for the 2D mode and the 3D mode and the overvoltage protection voltage level supplied in the 2D mode is smaller than the overvoltage protection voltage level supplied in the 3D mode thereby alleviating impact on components by over voltage when abnormality occurs in the 2D mode and thus extending the lifespan of the components. The present invention also provides a backlight drive circuit, which supplies different overvoltage protection voltage levels for a 2D mode and a 3D mode according to the different levels of driving voltage that an LED string needs in the 2D mode and the 3D mode so as to alleviate impact on components by over voltage when abnormality occurs in the 2D mode and thus extend the lifespan of the components.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 2:
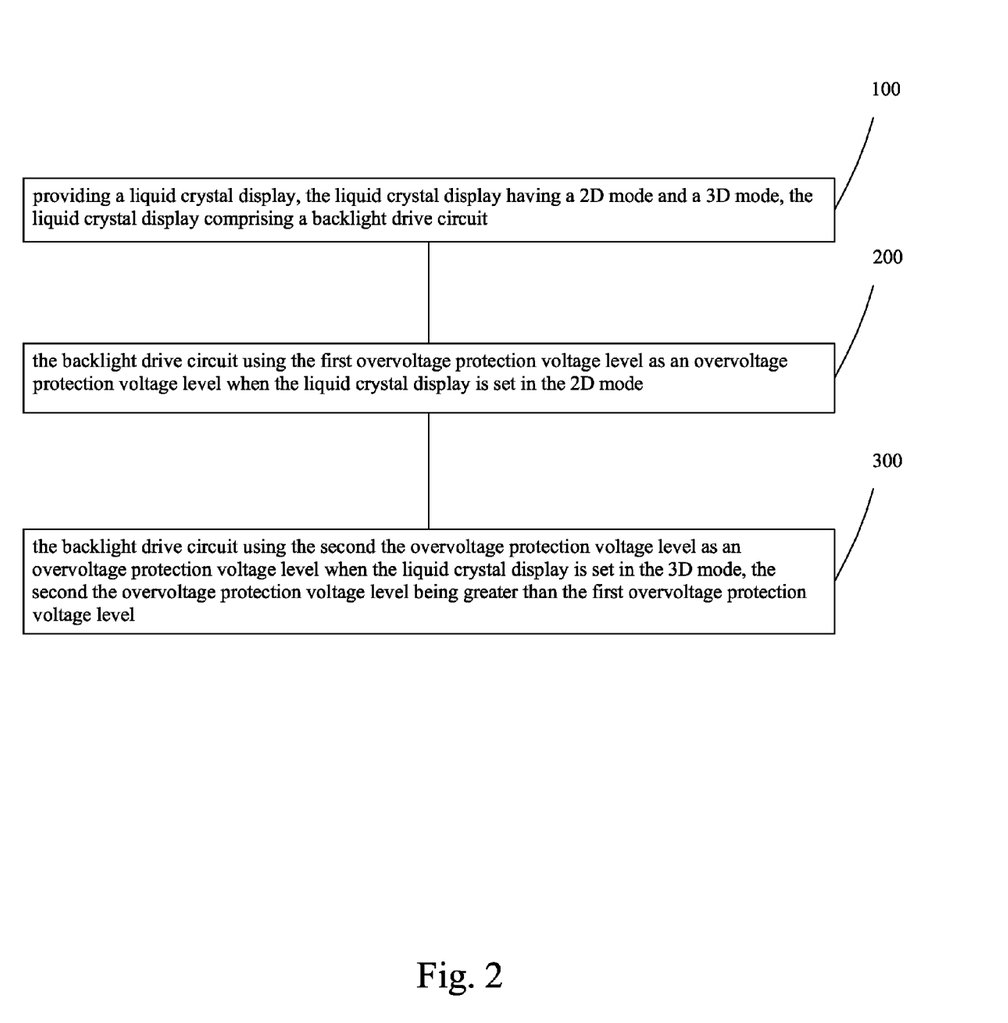
FIG. 2 is a flow chart illustrating an overvoltage protection method for backlight drive circuit of 2D/3D mode.
Figure 3:
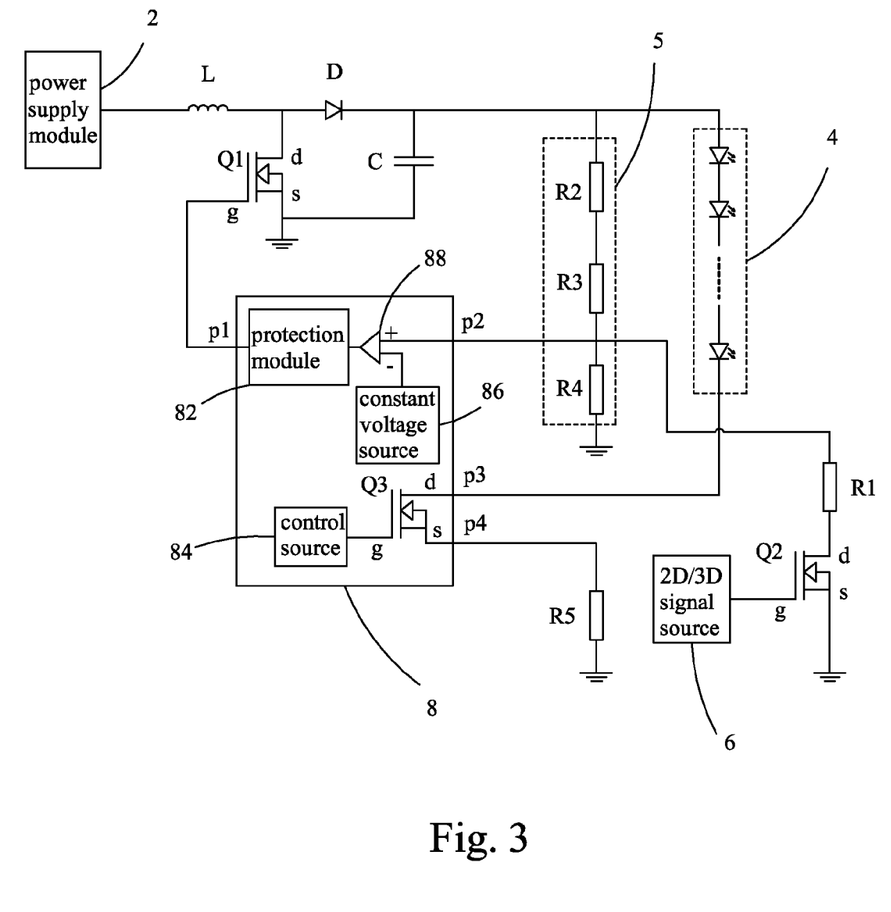
FIG. 3 is a circuit diagram of a backlight drive circuit according to a preferred embodiment of the present invention.

Referring to FIGS. 2 and 3, the present invention provides an overvoltage protection method for backlight drive circuit of 2D/3D mode, which comprises the following steps:

Step 100: providing a liquid crystal display (not shown), the liquid crystal display having a 2D mode and a 3D mode, the liquid crystal display comprising a backlight drive circuit.

In the instant preferred embodiment, the backlight drive circuit comprises: a power supply module 2, an electrical inductor L, which has an end electrically connected to the power supply module 2, and a rectification module electrically connected to an opposite end of the electrical inductor L, a filter module electrically connected to an opposite end of the rectification module, a voltage division module 5 electrically connected to the opposite end of the rectification module, an LED string 4 electrically connected to the opposite end of the rectification module, a first field effect transistor Q1 electrically connected to the opposite end of the electrical inductor L, a constant current driving chip 8 electrically connected to the first field effect transistor Q1, a first resistor R1 electrically connected to the constant current driving chip 8, an electrical switch electrically connected to the first resistor R1, and a 2D/3D signal source 6 electrically connected to the electrical switch. The constant current driving chip 8 is electrically connected to the LED string 4 and the voltage division module 5. The first field effect transistor Q1, the filter module, the voltage division module 5, the constant current driving chip 8, and the electrical switch are electrically connected to the ground line. The voltage division module 5 comprises: a second resistor R2, a third resistor R3, and a fourth resistor R4. The second, the third, the fourth resistors R2, R3, R4 are connected in series. When the liquid crystal display is operating in the 2D mode, the 2D/3D signal source 6 supplies an output of low voltage signal, controlling the electrical switch to open so that the first resistor R1 and the voltage division module 5 are disconnected from each other; and when the liquid crystal display operates in the 3D mode, the 2D/3D signal source 6 supplies an output of high voltage signal, controlling the electrical switch to close so that the first resistor R1 and the voltage division module 5 are set in parallel connection with each other.

In the instant preferred embodiment, the electrical switch comprises a second field effect transistor Q2, which is safe and reliable, saves energy, and has a long lifespan, so as to be advantageous in forming a highly integrated driving circuit. The second field effect transistor Q2 comprises: a gate terminal g, a drain terminal d, and a source terminal s. The gate terminal g is electrically connected to the 2D/3D signal source 6. The 2D/3D signal source 6 outputs a low voltage (0V) in the 2D mode and a high voltage (3.3V) in the 3D mode, in order to control the second field effect transistor Q2 to conduct on or cut off. The source terminal s is electrically connected to the ground line. The drain terminal d is electrically connected to the first resistor R1. The conduction-on state and the cut-off state of the second field effect transistor Q2 controls the first resistor R1 to be connected or disconnected.

The rectification module comprises a rectification diode D, which converts an output power of the power supply module 2 into a direct-current (DC) power. The rectification diode D comprises an anode terminal and a cathode terminal. The anode terminal is electrically connected to the electrical inductor L and the cathode terminal is electrically connected to a common terminal of the filter module, the voltage division module 5, and the LED string 4.

The filter module comprises an electrical capacitor C, which filters the rectified power to provide a steady electrical current. The electrical capacitor C has an end electrically connected to the cathode terminal of the rectification diode D and an opposite end connected to the ground line.

The first field effect transistor Q1 comprises a source terminal s, a gate terminal g, and a drain terminal d. The gate terminal g is electrically connected to the constant current driving chip 8. The source terminal s is electrically connected to the ground line. The drain terminal d is electrically connected to a common terminal of the electrical inductor L and the rectification diode D.

The constant current driving chip 8 comprises first to fourth pins p1, p2, p3, p4. The first pin p1 of the constant current driving chip 8 is electrically connected to the gate terminal g of the first field effect transistor Q1. The second pin p2 is electrically connected to the voltage division module 5. The third pin p3 is electrically connected to the LED string 4. The fourth pin p4 is electrically connected to the ground line. The second pin p2 of the constant current driving chip 8 and an end of the first resistor R1 are electrically connected to a common node between the third and fourth resistors R3, R4. The constant current driving chip 8 monitor the voltage at the common node of the third and fourth resistors R3, R4 in order to realize overvoltage protection for the output from the power supply module 2. In the 3D mode, the first resistor R1 and the fourth resistor R4 are connected in parallel and the total resistance of the parallel connected first and fourth resistors R1, R4 is less than the first resistor R1 or the fourth resistor R4. When the constant current driving chip 8 controls the first field effect transistor Q1 to conduct on and thus cutting of the output voltage, the voltage of the fourth resistor R4 is the same in both the 2D mode and the 3D mode, being slightly greater than 2V, whereby the current flowing through the second and third resistors R2, R3 in the 3D mode is greater than the current flowing through the second and third resistors R2, R3 in the 2D mode. In other words, an output of second overvoltage protection voltage level in the 3D mode is greater than an output of first overvoltage protection voltage level in the 2D mode, thereby realizing outputs of different overvoltage protection voltage levels for the 2D mode and the 3D mode.

The constant current driving chip 8 comprises: a constant current source 86, a voltage comparator 88 electrically connected to the constant current source 86, a protection module 82 electrically connected to the voltage comparator 88, a third field effect transistor Q3, and a control source 84 electrically connected to the third field effect transistor Q3. The voltage comparator 88 comprises: a positive pin, a negative pin, and an output pin. The positive pin is electrically connected to the second pin p2. The negative pin is electrically connected to the constant current source 86. The output pin is electrically connected to the protection module 82. The third field effect transistor Q3 has a drain terminal d electrically connected to the third pin p3, a source terminal s electrically connected to the four pin p4, and a gate terminal g electrically connected to the control source 84. The control source 84 supplies a signal to control the luminous brightness of the LED string 4. The protection module 82 is further electrically connected to the first pin p1. The constant current source 86 supplies an output voltage of 2V, whereby when the positive pin of the voltage comparator 88 has a voltage level greater than the voltage (2V) of the negative pin, the voltage comparator 88 outputs a high level. The protection module 82 outputs a square wave to drive the first field effect transistor Q1.

The backlight drive circuit further comprises a fifth resistor R5. The fifth resistor R5 is electrically connected between the four pin p4 and the ground line for limiting current. The LED string 4 comprises a plurality of LED lights connected in series.

Step 200: the backlight drive circuit using the first overvoltage protection voltage level as an overvoltage protection voltage level when the liquid crystal display is set in the 2D mode.

When the 2D/3D signal source 6 outputs a low level, the electrical switch is open and the first overvoltage protection voltage level of the drive circuit is $2/R4*(R2+R3)+2$, whereby when the backlight drive circuit supplies a driving voltage that is normally smaller than or equal to the first overvoltage protection voltage level, the constant current driving chip 8 supplies a low level to the first field effect transistor Q1, making the first field effect transistor Q1 in a cut-off state; and when the backlight drive circuit supplies a driving voltage that is abnormally smaller than or equal to the first overvoltage protection voltage level, the constant current driving chip 8 supplies a high level to the first field effect transistor Q1, making the first field effect transistor Q1 conducting, thereby forcing the driving voltage applied to the LED string 4 to be lowered down, wherein R2 is the resistance of the second resistor R2, R3 is the resistance of the third resistor R3, and R4 is the resistance of the fourth resistor R4.

When the liquid crystal display is operating in the 2D mode and the backlight drive circuit supplies a normal level of driving voltage (namely being smaller than or equal to the first overvoltage protection voltage level), the voltage at the positive pin of the voltage comparator 88 is lower than the voltage (2V) at the negative pin and the protection module 82 outputs a low level to the first field effect transistor Q1, making the first field effect transistor Q1 cut off; and when the liquid crystal display is in the 2D mode and the backlight drive circuit supplies an abnormal level of output voltage (namely being greater than the first overvoltage protection voltage level), the voltage at the positive pin of the voltage comparator 88 is greater than the voltage (2V) at the negative pin and the protection module 82 outputs a high level to the first field effect transistor Q1, making the first field effect transistor Q1 conducting and forcing the driving voltage applied to the LED string 4 to be lowered down thereby achieving protection.

Step 300: the backlight drive circuit using the second the overvoltage protection voltage level as an overvoltage protection voltage level when the liquid crystal display is set in the 3D mode, the second the overvoltage protection voltage level being greater than the first overvoltage protection voltage level.

The 2D/3D signal source 6 outputs a high level and the electrical switch is closed. The second the overvoltage protection voltage level of the drive circuit is $2/(R1\|R4)*(R2+R3)+2$, whereby when the backlight drive circuit supplies a driving voltage that is normally smaller than or equal to the second the overvoltage protection voltage level, the constant current driving chip 8 supplies a low level to the first field effect transistor Q1, making the first field effect transistor Q1 in a cut-off state; and when the backlight drive circuit supplies a driving voltage that is abnormally greater than the second overvoltage protection voltage level, the constant current driving chip 8 supplies a high level to the first field effect transistor Q1, making the first field effect transistor Q1 conducting, thereby forcing the driving voltage applied to the LED string 4 to be lowered down, wherein R1 is the resistance of the first resistor R1 and R1||R4 stands for $R1*R4/(R1+R4)$.

When the liquid crystal display is operating in the 3D mode and the backlight drive circuit supplies a normal level of driving voltage (namely being smaller than or equal to the second the overvoltage protection voltage level), the voltage at the positive pin of the voltage comparator 88 is lower than the voltage (2V) at the negative pin and the protection module 82 outputs a low level to the first field effect transistor Q1, making the first field effect transistor Q1 cut off; and when the liquid crystal display is in the 3D mode and the backlight drive circuit supplies an abnormal level of output voltage (namely being greater than the second the overvoltage protection voltage level), the voltage at the positive pin of the voltage comparator 88 is greater than the voltage (2V) at the negative pin and the protection module 82 outputs a high level to the first field effect transistor Q1, making the first field effect transistor Q1 conducting and forcing the driving voltage applied to the LED string 4 to be lowered down thereby achieving protection.

It is noted from the above description that $2/R4*(R2+R3)+2$ is less than $2/(R1\|R4)*(R2+R3)+2$, namely the first overvoltage protection voltage level of the 2D mode is smaller than the second the overvoltage protection voltage level of the 3D mode thereby achieving the result that different overvoltage protection voltage levels are provided for the 2D mode and the 3D mode and the first overvoltage protection voltage level of the 2D mode is smaller than the second the overvoltage protection voltage level of the 3D mode for the effect of alleviating impact on components by over voltage when abnormality occurs in the 2D mode and extending the lifespan of the components.

As an alternative solution, a bipolar junction transistor (not shown) is used to substitute the second field effect transistor Q2, whereby the 2D/3D signal source controls the bipolar junction transistor to conduct on or cut off so as to achieve the function of electrical switch. The bipolar junction transistor comprises: a base terminal, an emitter terminal, and a collector terminal, wherein the base terminal is electrically connected to the 2D/3D signal source 6; the emitter terminal is electrically connected to the ground line; and the collector terminal is electrically connected to the first resistor R1.

Referring to FIG. 3, the present invention also provides a backlight drive circuit, which comprises: a power supply module 2, an electrical inductor L, which has an end electrically connected to the power supply module 2, and a rectification module electrically connected to an opposite end of the electrical inductor L, a filter module electrically connected to an opposite end of the rectification module, a voltage division module 5 electrically connected to the opposite end of the rectification module, an LED string 4 electrically connected to the opposite end of the rectification module, a first field effect transistor Q1 electrically connected to the opposite end of the electrical inductor L, a constant current driving chip 8 electrically connected to the first field effect transistor Q1, a first resistor R1 electrically connected to the constant current driving chip 8, an electrical switch electrically connected to the first resistor R1, and a 2D/3D signal source 6 electrically connected to the electrical switch. The constant current driving chip 8 is electrically connected to the LED string 4 and the voltage division module 5. The first field effect transistor Q1, the filter module, the voltage division module 5, the constant current driving chip 8, and the electrical switch are electrically connected to the ground line. When a liquid crystal display that uses the backlight drive circuit is switched between the 2D mode and the 3D mode, a control board generates a 2D/3D signal source 6 to communicate with the backlight drive circuit. The electrical switch is controlled to close or open according to a high or low voltage signal supplied from the 2D/3D signal source 6, thereby controlling the first resistor R1 to connect to or disconnect from the voltage division module 5, thus achieving that in the 2D mode, the first resistor R1 is disconnected and an effect of lowering the overvoltage protection voltage level in the 2D mode is achieved and in the 3D mode, the first resistor R1 is connected and is set in parallel connection with the voltage division module 5 to effect flow division through parallel connection thereby achieving an effect of increasing the overvoltage protection voltage level in the 3D mode. Consequently, a result that different overvoltage protection voltage levels are provided for the 2D mode and the 3D mode is achieved so as to alleviate impact on components by over voltage when abnormality occurs in the 2D mode and thus extend the lifespan of the components.

Specifically, when the liquid crystal display is operating in the 2D mode, the 2D/3D signal source 6 supplies an output of low voltage signal, controlling the electrical switch to open so that the first resistor R1 and the voltage division module 5 are disconnected from each other; and when the liquid crystal display operates in the 3D mode, the 2D/3D signal source 6 supplies an output of high voltage signal, controlling the electrical switch to close so that the first resistor R1 and the voltage division module 5 are set in parallel connection with each other.

In the instant preferred embodiment, the electrical switch comprises a second field effect transistor Q2, which is safe and reliable, saves energy, and has a long lifespan, so as to be advantageous in forming a highly integrated driving circuit. The second field effect transistor Q2 comprises: a gate terminal g, a drain terminal d, and a source terminal s. The gate terminal g is electrically connected to the 2D/3D signal source 6. The 2D/3D signal source 6 outputs a low voltage (0V) in the 2D mode and a high voltage (3.3V) in the 3D mode, in order to control the second field effect transistor Q2 to conduct on or cut off. The source terminal s is electrically connected to the ground line. The drain terminal d is electrically connected to the first resistor R1.

The rectification module comprises a rectification diode D, which converts an output power of the power supply module 2 into a direct-current (DC) power. The rectification diode D comprises an anode terminal and a cathode terminal. The anode terminal is electrically connected to the electrical inductor L and the cathode terminal is electrically connected to a common terminal of the filter module, the voltage division module 5, and the LED string 4.

The filter module comprises an electrical capacitor C, which filters the rectified power to provide a steady electrical current. The electrical capacitor C has an end electrically connected to the cathode terminal of the rectification diode D and an opposite end connected to the ground line.

The first field effect transistor Q1 comprises a source terminal s, a gate terminal g, and a drain terminal d. The gate terminal g is electrically connected to the constant current driving chip 8. The source terminal s is electrically connected to the ground line. The drain terminal d is electrically connected to a common terminal of the electrical inductor L and the rectification diode D.

The voltage division module 5 comprises: a second resistor R2, a third resistor R3, and a fourth resistor R4. The second, the third, the fourth resistors R2, R3, R4 are connected in series. The constant current driving chip 8 comprises first to fourth pin p1, p2, p3, p4. The second pin p2 of the constant current driving chip 8 and an end of the first resistor R1 are electrically connected to a common node between the third and fourth resistors R3, R4. The constant current driving chip 8 monitor the voltage at the common node of the third and fourth resistors R3, R4 in order to realize overvoltage protection of output. In the 3D mode, the first resistor R1 and the fourth resistor R4 are connected in parallel and the total resistance of the parallel connected first and fourth resistors R1, R4 is less than the first resistor R1 or the fourth resistor R4. When the constant current driving chip 8 controls the first field effect transistor Q1 to conduct on and thus cutting of the output voltage, the voltage of the fourth resistor R4 is the same in both the 2D mode and the 3D mode, being slightly greater than 2V, whereby the current flowing through the second and third resistors R2, R3 in the 3D mode is greater than the current flowing through the second and third resistors R2, R3 in the 2D mode. In other words, an output of second overvoltage protection voltage level in the 3D mode is greater than an output of first overvoltage protection voltage level in the 2D mode, thereby realizing outputs of different overvoltage protection voltage levels for the 2D mode and the 3D mode.

The first pin p1 of the constant current driving chip 8 is electrically connected to the gate terminal g of the first field effect transistor Q1. The second pin p2 is electrically connected to the voltage division module 5. The third pin p3 is electrically connected to the LED string 4. The fourth pin p4 is electrically connected to the ground line. The constant current driving chip 8 comprises: a constant current source 86, the voltage comparator 88 electrically connected to the constant current source 86, the protection module 82 electrically connected to the voltage comparator 88, a third field effect transistor Q3, and a control source 84 electrically connected to the third field effect transistor Q3. The voltage comparator 88 comprises: a positive pin, a negative pin, and an output pin. The positive pin is electrically connected to the second pin p2. The negative pin is electrically connected to the constant current source 86. The output pin is electrically connected to the protection module 82. The third field effect transistor Q3 has a drain terminal d electrically connected to the third pin p3, a source terminal s electrically connected to the four pin p4, and a gate terminal g electrically connected to the control source 84. The control source 84 supplies a signal to control the luminous brightness of the LED string 4. The protection module 82 is further electrically connected to the first pin p1. The constant current source 86 supplies an output voltage of 2V, whereby when the positive pin of the voltage comparator 88 has a voltage level greater than the voltage (2V) of the negative pin, the voltage comparator 88 outputs a high level. The protection module 82 outputs a square wave to drive the first field effect transistor Q1.

The backlight drive circuit further comprises a fifth resistor R5. The fifth resistor R5 is electrically connected between the four pin p4 and the ground line for limiting current. The LED string 4 comprises a plurality of LED lights connected in series.

By adding an electrical switch and a first resistor R1 in the backlight drive circuit and using a 2D/3D signal source generated by a control board to control the electrical switch to conduct on or cut off, when a liquid crystal display that uses the backlight drive circuit is set in a 2D mode, the electrical switch is controlled by a low voltage (0V) and is thus open so that the first resistor R1 is disconnected and an overvoltage protection voltage level so supplied is 2/R4*(R2+R3)+2 volts. In a 3D mode, the electrical switch is controlled by a high voltage (3.3V) and is closed, so that the first resistor R1 is in parallel connection with a fourth resistor R4 and the overvoltage protection voltage level so supplied is 2/(R1∥R4)*(R2+R3)+2 voltages, wherein R1∥R4 stands for R1*R4/(R1+R4). It is apparent that the overvoltage protection voltage level supplied in the 2D mode is smaller than the overvoltage protection voltage level supplied in the 3D mode so as to alleviate impact on components by over voltage when abnormality occurs in the 2D mode and thus extend the lifespan of the components.

As an alternative solution, the electrical switch can be a bipolar junction transistor (not shown), whereby the 2D/3D signal source controls the bipolar junction transistor to conduct on or cut off so as to achieve the function of electrical switch. The bipolar junction transistor comprises: a base terminal, an emitter terminal, and a collector terminal, wherein the base terminal is electrically connected to the 2D/3D signal source 6; the emitter terminal is electrically connected to the ground line; and the collector terminal is electrically connected to the first resistor R1.

In summary, the present invention provides an overvoltage protection method for backlight drive circuit of 2D/3D mode, wherein by adding an electrical switch and a resistor and using a 2D/3D signal source generated by a control board to control the electrical switch to conduct on or cut off, the resistor is disconnected in a 2D mode to lower down the overvoltage protection voltage level supplied in the 2D mode and the resistor is connected in a 3D mode to increase the overvoltage protection voltage level supplied in the 3D mode. According to the different levels of driving voltage that an LED string needs in the 2D mode and the 3D mode, different overvoltage protection voltage levels are supplied for the 2D mode and the 3D mode and the overvoltage protection voltage level supplied in the 2D mode is smaller than the overvoltage protection voltage level supplied in the 3D mode thereby alleviating impact on components by over voltage when abnormality occurs in the 2D mode and thus extending the lifespan of the components. The present invention also provides a backlight drive circuit, which supplies different overvoltage protection voltage levels for a 2D mode and a 3D mode according to the different levels of driving voltage that an LED string needs in the 2D mode and the 3D mode so as to alleviate impact on components by over voltage when abnormality occurs in the 2D mode and thus extend the lifespan of the components.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An overvoltage protection method for backlight drive circuit of 2D/3D mode, comprising the following steps:
   (1) providing a liquid crystal display, the liquid crystal display having a 2D mode and a 3D mode, the liquid crystal display comprising a backlight drive circuit;
   (2) the backlight drive circuit using the first overvoltage protection voltage level as an overvoltage protection voltage level when the liquid crystal display is set in the 2D mode; and
   (3) the backlight drive circuit using the second the overvoltage protection voltage level as an overvoltage protection voltage level when the liquid crystal display is set in the 3D mode, the second the overvoltage protection voltage level being greater than the first overvoltage protection voltage level.

2. The overvoltage protection method for backlight drive circuit of 2D/3D mode as claimed in claim 1, wherein the backlight drive circuit comprises: a power supply module, an electrical inductor, which has an end electrically connected to the power supply module, and a rectification module electrically connected to an opposite end of the electrical inductor, a filter module electrically connected to an opposite end of the rectification module, a voltage division module electrically connected to the opposite end of the rectification module, an LED string electrically connected to the opposite end of the rectification module, a first field effect transistor electrically connected to the opposite end of the electrical inductor, a constant current driving chip electrically connected to the first field effect transistor, a first resistor electrically connected to the constant current driving chip, an electrical switch electrically connected to the first resistor, and a 2D/3D signal source electrically connected to the electrical switch, the constant current driving chip being electrically connected to the LED string and the voltage division module, the first field effect transistor, the filter module, the voltage division module, the constant current driving chip, and the electrical switch being electrically connected to a ground line, the voltage division module comprising: a second resistor, a third resistor, and a fourth resistor, the second, the third, the fourth resistors being connected in series.

3. The overvoltage protection method for backlight drive circuit of 2D/3D mode as claimed in claim 2, wherein when the liquid crystal display is operating in the 2D mode, the 2D/3D signal source supplies an output of low voltage signal, controlling the electrical switch to open so that the first resistor and the voltage division module are disconnected from each other; and when the liquid crystal display operates in the 3D mode, the 2D/3D signal source supplies an output of high voltage signal, controlling the electrical switch to close so that the first resistor and the voltage division module are set in parallel connection with each other.

4. The overvoltage protection method for backlight drive circuit of 2D/3D mode as claimed in claim 2, wherein in Step (2), when the 2D/3D signal source outputs a low level, the electrical switch is open and the first overvoltage protection voltage level of the drive circuit is 2/R4*(R2+R3)+2, whereby when the backlight drive circuit supplies a driving voltage that is normally smaller than or equal to the first overvoltage protection voltage level, the constant current driving chip supplies a low level to the first field effect transistor, making the first field effect transistor in a cut-off state; and when the backlight drive circuit supplies a driving voltage that is abnormally greater than the first overvoltage protection voltage level, the constant current driving chip supplies a high level to the first field effect transistor, making the first field effect transistor conducting, thereby forcing the driving voltage applied to the LED string to be lowered down, wherein R2 is the resistance of the second resistor, R3 is the resistance of the third resistor, and R4 is the resistance of the fourth resistor; and in Step (3), the 2D/3D signal source outputs a high level and the electrical switch is closed, the second the overvoltage protection voltage level of the drive circuit being 2/(R1∥R4)*(R2+R3)+2, whereby when the backlight drive circuit supplies a driving voltage that is normally smaller than or equal to the second the overvoltage protection voltage level, the constant current driving chip supplies a low level to the first field effect transistor, making the first field effect transistor in a cut-off state; and when the backlight drive circuit supplies a driving voltage that is abnormally greater than the second overvoltage protection voltage level, the constant current driving chip supplies a high level to the first field effect transistor, making the first field effect transistor conducting, thereby forcing the driving voltage applied to the LED string to be lowered down, wherein R1 is the resistance of the first resistor and R1∥R4 stands for R1*R4/(R1+R4).

5. The overvoltage protection method for backlight drive circuit of 2D/3D mode as claimed in claim 2, wherein the electrical switch comprises a second field effect transistor or a bipolar junction transistor, the rectification module comprising a rectification diode, the rectification diode having an anode terminal and a cathode terminal, the anode terminal being electrically connected to the electrical inductor, the cathode terminal being electrically connected to a common terminal of the filter module, the voltage division module, and the LED string, the filter module comprising an electrical capacitor, the electrical capacitor having an end electrically connected to the cathode terminal of the rectification diode and an opposite end connected to the ground line, the first field effect transistor comprising a source terminal, a gate terminal, and a drain terminal, the gate terminal being electrically connected to the constant current driving chip, the source terminal being electrically connected to the ground line, the drain terminal being electrically connected to a common terminal of the electrical inductor and the rectification diode, the constant current driving chip comprising first to fourth pins, the first pin being electrically connected to the gate terminal of the first field effect transistor, the second pin being electrically connected to the voltage division module, the third pin being electrically connected to the LED string, the fourth pin being electrically connected to the ground line, the constant current driving chip comprising: a constant current source, a voltage comparator electrically connected to the constant current source, a protection module electrically connected to the voltage comparator, a third field effect transistor, and a control source electrically connected to the third field effect transistor, the voltage division module comprising: the second resistor, the third resistor, and the fourth resistor, the second, the third, and the fourth resistor being connected in series, the second pin of the constant current driving chip and an end of the first resistor being electrically connected to a common node between the third and fourth resistors.

6. An overvoltage protection method for backlight drive circuit of 2D/3D mode, comprising the following steps:
(1) providing a liquid crystal display, the liquid crystal display having a 2D mode and a 3D mode, the liquid crystal display comprising a backlight drive circuit;
(2) the backlight drive circuit using the first overvoltage protection voltage level as an overvoltage protection voltage level when the liquid crystal display is set in the 2D mode; and
(3) the backlight drive circuit using the second the overvoltage protection voltage level as an overvoltage protection voltage level when the liquid crystal display is set in the 3D mode, the second the overvoltage protection voltage level being greater than the first overvoltage protection voltage level; and
wherein the backlight drive circuit comprises: a power supply module, an electrical inductor, which has an end electrically connected to the power supply module, and a rectification module electrically connected to an opposite end of the electrical inductor, a filter module electrically connected to an opposite end of the rectification module, a voltage division module electrically connected to the opposite end of the rectification module, an LED string electrically connected to the opposite end of the rectification module, a first field effect transistor electrically connected to the opposite end of the electrical inductor, a constant current driving chip electrically connected to the first field effect transistor, a first resistor electrically connected to the constant current driving chip, an electrical switch electrically connected to the first resistor, and a 2D/3D signal source electrically connected to the electrical switch, the constant current driving chip being electrically connected to the LED string and the voltage division module, the first field effect transistor, the filter module, the voltage division module, the constant current driving chip, and the electrical switch being electrically connected to a ground line, the voltage division module comprising: a second resistor, a third resistor, and a fourth resistor, the second, the third, the fourth resistors being connected in series;
wherein when the liquid crystal display is operating in the 2D mode, the 2D/3D signal source supplies an output of low voltage signal, controlling the electrical switch to open so that the first resistor and the voltage division module are disconnected from each other; and when the liquid crystal display operates in the 3D mode, the 2D/3D signal source supplies an output of high voltage signal, controlling the electrical switch to close so that the first resistor and the voltage division module are set in parallel connection with each other;
wherein in Step (2), when the 2D/3D signal source outputs a low level, the electrical switch is open and the first overvoltage protection voltage level of the drive circuit is 2/R4*(R2+R3)+2, whereby when the backlight drive circuit supplies a driving voltage that is normally smaller than or equal to the first overvoltage protection voltage level, the constant current driving chip supplies a low level to the first field effect transistor, making the first field effect transistor in a cut-off state; and when the backlight drive circuit supplies a driving voltage that is abnormally greater than the first overvoltage protection voltage level, the constant current driving chip supplies a high level to the first field effect transistor, making the first field effect transistor conducting, thereby forcing the driving voltage applied to the LED string to be lowered down, wherein R2 is the resistance of the second resistor, R3 is the resistance of the third resistor, and R4 is the resistance of the fourth resistor; and in Step (3), the 2D/3D signal source outputs a high level and the electrical switch is closed, the second the overvoltage protection voltage level of the drive circuit being 2/(R1∥R4)*(R2+R3)+2, whereby when the backlight drive circuit supplies a driving voltage that is normally smaller than or equal to the second the overvoltage protection voltage level, the constant current driving chip supplies a low level to the first field effect transistor, making the first field effect transistor in a cut-off state; and when the backlight drive circuit supplies a driving voltage that is abnormally greater than the second overvoltage protection voltage level, the constant current driving chip supplies a high level to the first field effect transistor, making the first field effect transistor conducting, thereby forcing the driving voltage applied to the LED string to be lowered down, wherein R1 is the resistance of the first resistor and R1∥R4 stands for R1*R4/(R1+R4); and wherein the electrical switch comprises a second field effect transistor or a bipolar junction transistor, the rectification module comprising a rectification diode, the rectification diode having an anode terminal and a cathode terminal, the anode terminal being electrically connected to the electrical inductor, the cathode terminal being electrically connected to a common terminal of the filter module, the voltage division module, and the LED string, the filter module comprising an electrical capacitor, the electrical capacitor having an end electrically connected to the cathode terminal of the rectification diode and an opposite end connected to the ground line, the first field effect transistor comprising a source terminal, a gate terminal, and a drain terminal, the gate terminal being electrically connected to the constant current driving chip, the source terminal being electrically connected to the ground line, the drain terminal being electrically connected to a common terminal of the electrical inductor and the rectification diode, the constant current driving chip comprising first to fourth pins, the first pin being electrically connected to the gate terminal of the first field effect transistor, the second pin being electrically connected to the voltage division module, the third pin being electrically connected to the LED string, the fourth pin being electrically connected to the ground line, the constant current driving chip comprising: a constant current source, a voltage comparator electrically connected to the constant current source, a protection module electrically connected to the voltage comparator, a third field effect transistor, and a control source electrically connected to the third field effect transistor, the voltage division module comprising: the second resistor, the third resistor, and the fourth resistor, the second, the third, and the fourth resistor being connected in series, the second pin of the constant current driving chip and an end of the first resistor being electrically connected to a common node between the third and fourth resistors.

7. A backlight drive circuit, comprising: a power supply module, an electrical inductor, which has an end electrically connected to the power supply module, and a rectification module electrically connected to an opposite end of the electrical inductor, a filter module electrically connected to an opposite end of the rectification module, a voltage division module electrically connected to the opposite end of the rectification module, an LED string electrically connected to the opposite end of the rectification module, a first field effect transistor electrically connected to the opposite end of the electrical inductor, a constant current driving chip electrically connected to the first field effect transistor, a first resistor electrically connected to the constant current driving chip, an electrical switch electrically connected to the first resistor, and a 2D/3D signal electrically connected to the electrical switch, the constant current driving chip being electrically connected to the LED string and the voltage division module, the first field effect transistor, the filter module, the voltage division module, the constant current driving chip, and the electrical switch being electrically connected to a ground line, whereby the electrical switch is controlled to close or open according to a high or low voltage signal supplied from the 2D/3D signal source, thereby controlling the first resistor to connect to or disconnect from the voltage division module.

8. The backlight drive circuit as claimed in claim 7, wherein the electrical switch comprises a second field effect transistor or a bipolar junction transistor.

9. The backlight drive circuit as claimed in claim 7, wherein the rectification module comprises a rectification diode, the rectification diode having an anode terminal and a cathode terminal, the anode terminal being electrically connected to the electrical inductor, the cathode terminal being electrically connected to a common terminal of the filter module, the voltage division module, and the LED string, the filter module comprising an electrical capacitor, the electrical capacitor having an end electrically connected to the cathode terminal of the rectification diode and an opposite end connected to the ground line, the first field effect transistor comprising a source terminal, a gate terminal, and a drain terminal, the gate terminal being electrically connected to the constant current driving chip, the source terminal being electrically connected to the ground line, the drain terminal being electrically connected to a common terminal of the electrical inductor and the rectification diode.

10. The backlight drive circuit as claimed in claim 9, wherein the constant current driving chip comprises first to fourth pins, the first pin being electrically connected to the gate terminal of the first field effect transistor, the second pin being electrically connected to the voltage division module, the third pin being electrically connected to the LED string, the fourth pin being electrically connected to the ground line, the constant current driving chip comprising: a constant current source, a voltage comparator electrically connected to the constant current source, a protection module electrically connected to the voltage comparator, a third field effect transistor, and a control source electrically connected to the third field effect transistor.

11. The backlight drive circuit as claimed in claim 10, wherein the voltage division module comprising: a second resistor, a third resistor, and a fourth resistor, the second, the third, and the fourth resistors being connected in series, the second pin of the constant current driving chip and an end of the first resistor being electrically connected to a common node between the third and fourth resistors.

* * * * *